(12) United States Patent
Harrison et al.

(10) Patent No.: US 7,278,536 B1
(45) Date of Patent: Oct. 9, 2007

(54) MOLDED PLASTIC CONVEYOR CHAIN MEMBER FOR PROCESSING POULTRY

(75) Inventors: James J. Harrison, Bernville, PA (US); Joseph G. Gianfalla, Tampa, FL (US)

(73) Assignee: Habasit AG, Reinach-Basel (CH)

( * ) Notice: Subject to any disclaimer, the term of this patent is extended or adjusted under 35 U.S.C. 154(b) by 0 days.

(21) Appl. No.: 11/342,352

(22) Filed: Jan. 26, 2006

Related U.S. Application Data

(60) Provisional application No. 60/647,478, filed on Jan. 26, 2005.

(51) Int. Cl.
*B65G 25/00* (2006.01)

(52) U.S. Cl. .......................... 198/867.09; 198/803.12; 198/867.01

(58) Field of Classification Search .......... 198/867.01, 198/867.09, 867.12, 803.12, 803.15, 850–853; 452/177, 196
See application file for complete search history.

(56) References Cited

U.S. PATENT DOCUMENTS

| | | | | |
|---|---|---|---|---|
| 1,749,224 | A | * | 3/1930 | Ostricher ............... 198/803.12 |
| 4,385,419 | A | | 5/1983 | Cantrell |
| 4,716,624 | A | | 1/1988 | Massey, Jr. |
| 4,886,156 | A | * | 12/1989 | Records et al. ............. 198/692 |
| 4,927,205 | A | * | 5/1990 | Bowler et al. ................ 294/94 |
| 4,930,620 | A | * | 6/1990 | Springman ............. 198/867.15 |
| 5,080,630 | A | | 1/1992 | Tieleman et al. |
| 5,083,974 | A | | 1/1992 | Martin et al. |
| 5,492,503 | A | * | 2/1996 | Davis ......................... 452/179 |
| 5,535,876 | A | | 7/1996 | Fortenberry et al. |
| 5,769,476 | A | * | 6/1998 | Lawn et al. ............... 294/99.1 |
| 6,283,847 | B1 | | 9/2001 | Berry et al. |
| 6,422,379 | B1 | * | 7/2002 | Zoppas ................... 198/803.12 |
| 6,491,157 | B1 | * | 12/2002 | Kolling et al. ......... 198/867.11 |
| 6,688,461 | B1 | | 2/2004 | Frazier et al. |

* cited by examiner

*Primary Examiner*—Douglas A Hess
(74) *Attorney, Agent, or Firm*—Thomas M. Freiburger

(57) ABSTRACT

A conveyor chain for poultry processing is formed of injection molded regular links in serially connected relationship, and has at intervals a special link adapted to receive a threaded stud for a chicken carcass-supporting cone or other structure. The special link has a base portion which is of preferably the same configuration as the regular links. Above this, integrally molded with the base portion, is a platform with laterally outwardly extending flanges for stability against tilting. A threaded boss extends up from the platform and has a threaded internal bore extending vertically, to receive a threaded stud. The threaded boss comprises a relatively light plastic cylinder and has regularly extending buttresses stabilizing it on the platform. The special link is integrally formed by injection molding of a suitable material such as acetal, and is light in weight and profile.

13 Claims, 3 Drawing Sheets

MOLDED PLASTIC CONVEYOR CHAIN MEMBER FOR PROCESSING POULTRY

This application claims benefit of provisional application Ser. No. 60/647,478 filed Jan. 26, 2005.

BACKGROUND AND SUMMARY OF THE INVENTION

This invention concerns conveyor belts and chains, and processes employing conveyor belts, and more particularly the invention is directed to a conveyor chain of molded plastic material, with special chain links at spaced locations, fashioned similar to the normal links but with provision for stably supporting an upright member that supports apparatus for holding poultry in a production line in which the poultry is deboned or otherwise processed.

Chicken processing conveyors and deboning conveyors are shown in U.S. Pat. Nos. 4,385,419, 5,535,876, 4,716,624, 5,080,630, 6,283,847 and 6,688,461. See also U.S. Pat. Nos. 1,749,224 and 5,083,974.

As shown in many of the above-listed patents, what is needed in such a poultry processing line is typically a rigid upright stud which might carry a cone-shaped poultry carcass supporting device. Such a processing line is often called a "cone line". Typically the upright stud is a stainless steel rod. In U.S. Pat. No. 6,283,847 such studs are provided on a belt of metal plates. In U.S. Pat. No. 4,716,624 the studs are again welded to metal chain links. In U.S. Pat. No. 4,385,419 another arrangement is shown with metal cone-supporting studs extending up from metal chain links, welded or bolted to the metal links. Side tracks are provided to engage with the chain links to prevent lateral tipping of the chain while a chicken is deboned.

In U.S. Pat. No. 6,688,461, studs are shown connected to a plastic or steel chain, but by means of special mounting blocks at spaced locations which fit over and mount onto links of the chain, as attachments. U.S. Pat. No. 5,535,876 shows another arrangement whereby a chain comprised of a series of linked modules, and capable of traveling around gentle curves, includes a special link at spaced locations (e.g. about every fifth link), these special links being machined blocks with threaded holes to receive an upright stud, each block taking the place of a normal link in the chain.

There has been a need for an efficiently and economically produced chain link for a plastic conveyor chain, providing a stable support for a threaded upright stud for poultry processing.

According to the current invention, such a chain link is integrally injection molded and is similar in substantially all respects to a normal link of a modular molded plastic conveyor chain in a lower portion of the special link, but with an efficient upper structure of the link to support a rod or stud for use in poultry processing, in an upwardly-extending threaded boss. The special stud-supporting links are made to fit directly as substitutes for links in thermoplastic chain conveyors for the food industry such as, for example, N12000 thermoplastic chain, 2" pitch, manufactured by KVP Falcon Plastic Belting, Inc. of Reading, Pa., either straight-travel chain or radius chain. These chains are typically made of food grade and temperature-insensitive materials such as propylene and acetal, and the stud-supporting links may be made of the same materials.

The poultry processing plastic chain link of the invention has distinct advantages over prior poultry processing links, in strength, weight and efficiency of manufacture. The lower or base portion of the link is essentially the same as the other links of the chain within which the special link fits. It is integrally molded, preferably injection molded, made with a minimum of plastic material. A pair of stabilizing flanges or ledges extend laterally outwardly just above the base portion, and extending upwardly from the platform defining these ledges is a female-threaded boss that receives the threaded rod for a chicken-holding cone or other structure used in poultry processing. The threaded boss is formed with minimal plastic material, essentially a threaded cylinder, a relatively light mass of material, but with a series of buttresses or ribs on the outside of the cylinder, stabilizing the threaded cylinder on the platform. This construction achieves minimal weight and efficiency in production, as compared to a prior art plastic device which was machined and consisted of a very heavy block of material that had a threaded hole extending down into that block of material.

Accordingly, it is an object of the invention to improve the cost efficiency, strength, weight, convenience of assembly and operation, and performance capability in a stud-supporting conveyor chain, particularly for supporting poultry for manual operations, with an injection molded thermoplastic chain link which has a lower portion conforming substantially precisely to the size and shape of other chain links in the chain, and an upper portion that has stabilizing edges and a strong and rigidly supported screw thread for receiving a threaded stud rod to extend upwardly. These and other objects, advantages and features of the invention will be apparent from the following description of a preferred embodiment, considered along with the accompanying drawings.

DESCRIPTION OF PREFERRED EMBODIMENTS

Figure 1:
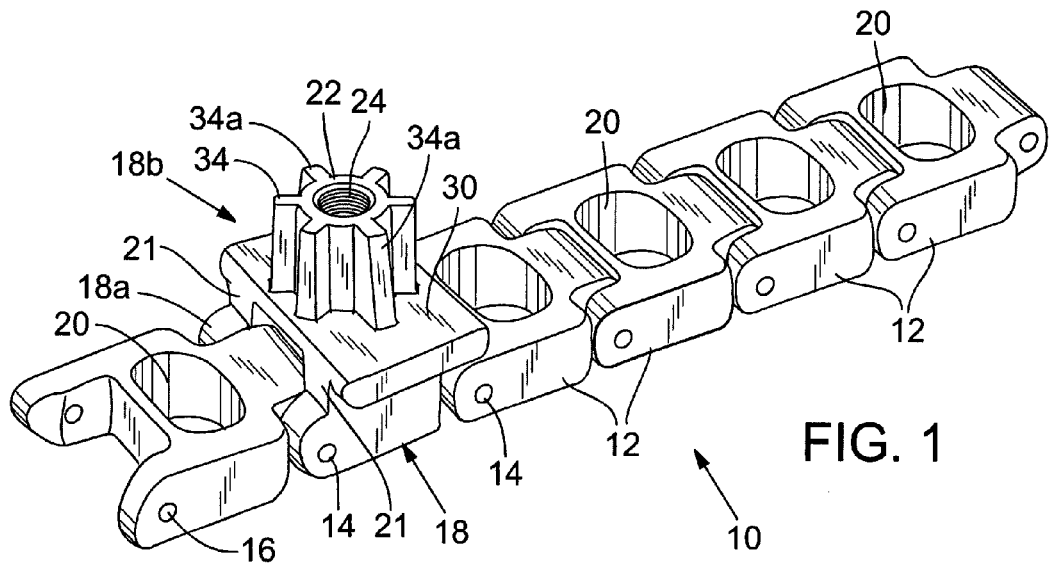
FIG. 1 is a perspective view showing a portion of a conveyor chain formed of linked modules, with modules at spaced locations comprising a stud-supporting molded plastic module according to the invention.

In the drawings, FIG. 1 shows a chain 10 of molded plastic modules 12, in this particular example shown as KVP N12000 thermoplastic chain. The illustrated chain is N12000S, meaning straight, but could also be KVP's N12000R, a similar chain that will travel around a radius, normally including hold-down tabs at sides on each link, to travel in stationary grooves for chain stability. The links 12 are held successively to one another by connecting pins 14 that are retained in holes 16, as can be seen in the drawing. These pins typically, but not necessarily, are of stainless steel.

Figure 2:
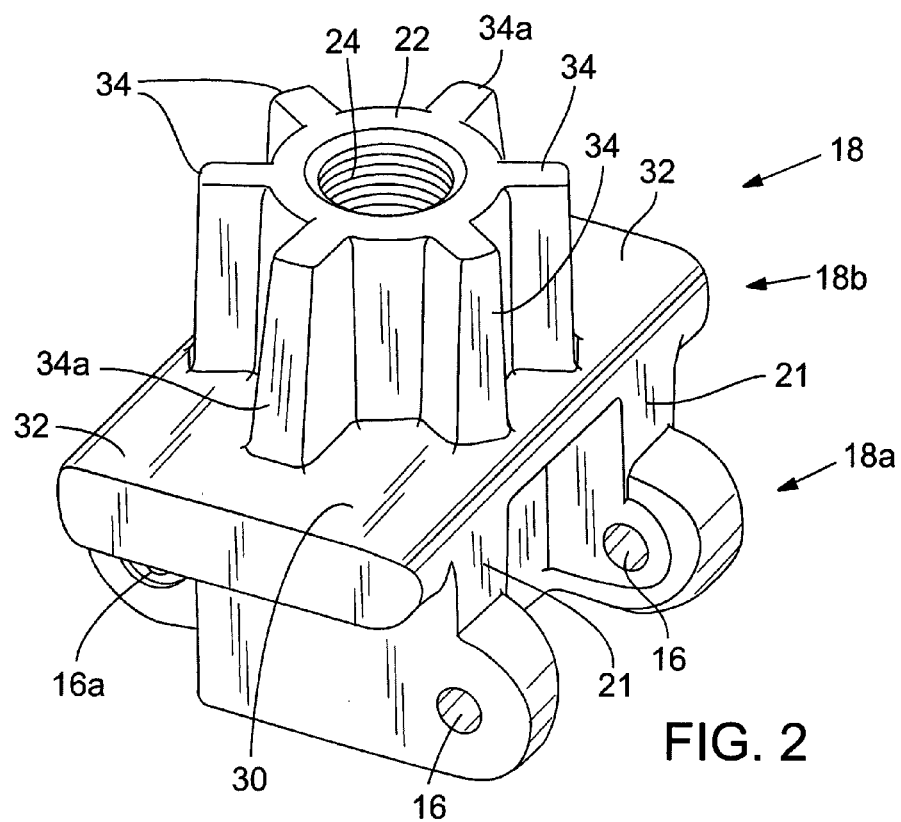
FIG. 2 is a perspective view showing a link or module of the invention.
Figure 3:
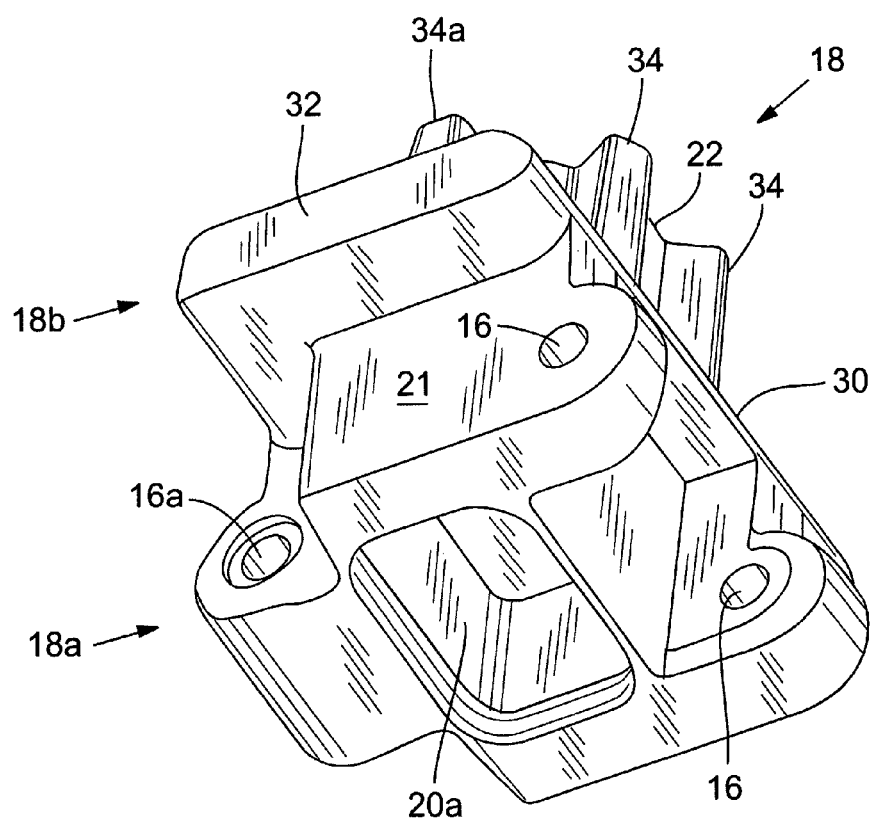
FIG. 3 is a perspective view showing the bottom of one of the stud-supporting links according to the invention.

FIG. 1 shows that special links 18, which are of the same base size and shape of the normal links 12, are placed in the chain 10 at intervals. The special link 18 has a bottom or base portion 18a that substitutes preferably precisely for a normal link 12, with pin apertures 16 in the same locations, including at both ends of the link (aperture 16a is seen in FIGS. 2 and 3), and with a bottom sprocket driving recess (at 20a in FIG. 3—not seen in FIG. 1), in substantially precisely the same location as a sprocket recess or opening 20 in each of the normal links 12, the belt being driven from the bottom by a sprocket (not shown).

Figure 4:
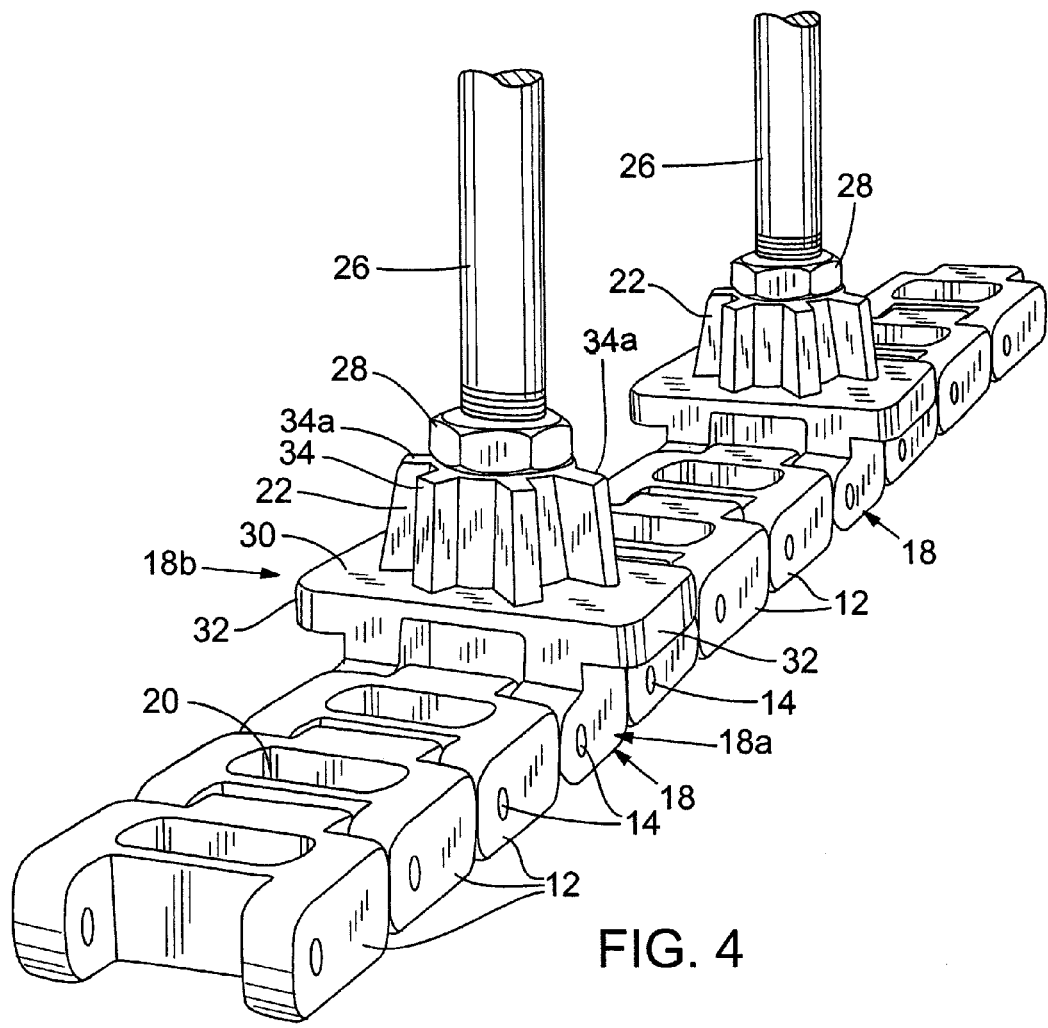
FIG. 4 is a perspective view similar to FIG. 1, from a different angle, and showing upright studs connected into the modules.

The special modules, as seen in all the drawing figures, have a top portion or superstructure 18b which extends up from the base 18a with walls 21 to support a threaded collar or block 22, i.e. a threaded boss extending up from the base. The collar or block has a generally central, vertical threaded bore 24 designed to support an upright stud that can hold poultry for an operation such a deboning operation. Uprights are shown as stainless stud rods 26 in FIG. 4. Lock nuts 28 may be used to prevent the studs 26 from coming loose in the event of vibration, twisting forces, etc.

In the particular preferred embodiment illustrated, the special modules 18 have a platform 30, that preferably includes laterally-extending ledges or flanges 32 which engage in wear strip slots (not shown) along both sides of the chain, to provide stability against tipping during travel and the operations to be conducted. Such wear strip slots are shown in U.S. Pat. No. 5,535,876, referenced above. The platform 30 is minimally above the base portion 18a, as low as possible. Its bottom surface may be, for example, a maximum of ¼" above the level of the tops of the regular links 12, for a 2" pitch belt. The bottom could be at the level of the tops of the links 12.

The illustrated embodiment includes buttresses or ribs 34 as stabilizing supports positioned generally radially around the central threaded boss or collar 22, to provide strength and stability to the stud support. In a preferred embodiment there are six of these buttresses, the buttresses 34a at left and right lateral sides being wider and preferably more tapered and buttress-shaped, to assure adequate lateral tilt stability and strength. For a 2" pitch belt, as in the KVP belt referenced above, the width of the platform 30 may be about 3", and the length of the platform from front to back about 1⅞". The thickness of the platform 30 may be about ¼" to ⁷⁄₁₆" for a 2" pitch belt, preferably ⅜" to ⁷⁄₁₆". The boss or collar in this embodiment extends up about 1" from the platform 30, and the threaded hole 24 may be about ¾" diameter, extending down more than 1", to about 1½" if desired. The widest spread of the buttresses, the base sides of the buttresses 34a, may be about 2¼". As noted above the platform 30 is as low as possible or practicable on the base 18a; it may be raised slightly (e.g. ⅛" to ¼") in order to obtain a deeper threaded bore 24, which can extend down through the boss or collar 22 and into the platform structure. The platform 30 could sit directly at the level of the regular link 12 tops if desired. These preferred dimensions can vary somewhat, and the module can be larger or smaller for different belt pitches.

The special stud-supporting module chain 18 of the invention is integrally molded, including the base and upper portions 18a and 18b. Preferred plastic materials for food applications include propylene and acetal. The screw thread in the hole 24 can be made by tapping the hole after molding the module, but with a more sophisticated mold the thread can be produced in the injection molding operation, the thread molding element then unscrewing from the threaded hole. Such unscrewing molds are well known.

The prior art failed to contemplate a cone-line chain module particularly for poultry processing wherein the module is integrally molded (preferably injection molded), and having a base portion which is substantially a precise duplicate of the normal chain modules within which it is interfitted. Further, the prior art neither embraced nor suggested a stud support such as described above and shown in the drawings. Considerable cost savings are realized over a machined block. The stud-supporting internal thread is formed in a relatively thin upstanding boss or collar, with braces or buttresses, rather than being formed in a heavy, solid machined block. This produces considerable savings in material and weight; weight is important in driving energy requirements.

The above described preferred embodiments are intended to illustrate the principles of the invention, but not to limit its scope. Other embodiments and variations to these preferred embodiments will be apparent to those skilled in the art and may be made without departing from the spirit and scope of the invention.

We claim:

1. A special link for a chain of plastic modules connected by link pins, the special link being of molded plastic and being adapted for use at intervals to replace a regular link in the chain at such intervals, for the purpose of supporting a threaded stud for poultry processing, comprising:
   a base portion configured to be similar to a regular link in a chain in which the special link is to be incorporated,
   a platform just above the base portion, the platform including flanges extending laterally outwardly in opposed directions to extend slightly outwardly widthwise from the base portion and from a chain in which the special link is incorporated, for engagement with stationary slots to stabilize the special links in a processing operation,
   a threaded boss extending up from the platform, of minimal thickness and integrally molded with the platform and the base portion, the boss comprising a narrow upstanding structure of smaller width and length than the base portion, the boss having a threaded internal bore extending vertically down into the boss, and
   buttress means integrally molded with the boss and the platform for stabilizing the threaded boss on the platform,
   whereby, with a series of the special links positioned at desired intervals within a conveyor chain for poultry processing, a threaded stud may be supported in each of the special links to extend upwardly to retain a poultry carcass supporting device in a poultry processing line, the special links being of minimal profile and weight.

2. A special link as in claim 1, wherein the platform is within about ¼" above the base portion.

3. A special link as in claim 1, wherein the platform is approximately ⅜" in thickness, for a chain pitch of about 2".

4. A special link as in claim 1, wherein the threaded boss comprises generally an upstanding cylinder as said upstanding structure and wherein the buttress means comprises a series of buttresses positioned generally radially relative to the cylinder and integrally molded with the boss, the platform and the base portion.

5. A special link as in claim 4, wherein each buttress comprises a radial wall extending radially outwardly a short distance from the cylinder.

6. A special link as in claim 1, wherein the special link is formed of injection-molded acetal.

7. A poultry processing conveyor chain with serially-connected regular chain links and including, at intervals, special links as defined in claim 1.

8. A special link for a chain of plastic modules connected by link pins, the special link being of molded plastic and being adapted for use at intervals to replace a regular link in the chain at such intervals, for the purpose of receiving a threaded stud, comprising:

a base portion configured to be similar to a regular link in a chain in which the special link is to be incorporated, a platform just above the base portion, the platform including flanges extending laterally outwardly in opposed directions to extend slightly outwardly widthwise from the base portion and from a chain in which the special link is incorporated, for engagement with stationary slots to stabilize the special links in a processing operation, a threaded boss extending up from the platform, of minimal thickness and integrally molded with the platform and the base portion, the boss comprising a narrow upstanding structure of smaller width and length than the base portion, the boss having a threaded internal bore extending vertically down into the boss, and buttress means integrally molded with the boss and the platform for stabilizing the threaded boss on the platform, whereby, with a series of the special links positioned at desired intervals within a conveyor chain, a threaded stud may be screwed into each of the special links to extend upwardly to retain a processing implement, the special links being of minimal profile and weight.

9. A special link as in claim 8, wherein the platform is within about ¼" above the base portion.

10. A special link as in claim 8, wherein the threaded boss comprises generally an upstanding cylinder as said upstanding structure and wherein the buttress means comprises a series of buttresses positioned generally radially relative to the cylinder and integrally molded with the boss, the platform and the base portion.

11. A special link as in claim 10, wherein each buttress comprises a radial wall extending radially outwardly a short distance from the cylinder.

12. A special link as in claim 8, wherein the special link is formed of injection-molded acetal.

13. A poultry processing conveyor chain with serially-connected regular chain links and including, at intervals, special links as defined in claim 8.

* * * * *